United States Patent
Kim et al.

(10) Patent No.: US 8,780,873 B2
(45) Date of Patent: Jul. 15, 2014

(54) METHOD FOR TRANSMITTING MEDIA ACCESS CONTROL PROTOCOL DATA UNIT

(75) Inventors: Jeong Ki Kim, Anyang-si (KR); Young Soo Yuk, Anyang-si (KR); Yong Ho Kim, Anyang-si (KR); Ki Seon Ryu, Anyang-si (KR)

(73) Assignee: LG Electronics Inc., Seoul (KR)

(*) Notice: Subject to any disclaimer, the term of this patent is extended or adjusted under 35 U.S.C. 154(b) by 139 days.

(21) Appl. No.: 13/258,991

(22) PCT Filed: Apr. 14, 2010

(86) PCT No.: PCT/KR2010/002286
§ 371 (c)(1),
(2), (4) Date: Sep. 22, 2011

(87) PCT Pub. No.: WO2010/120103
PCT Pub. Date: Oct. 21, 2010

(65) Prior Publication Data
US 2012/0014366 A1    Jan. 19, 2012

Related U.S. Application Data (60) Provisional application No. 61/168,938, filed on Apr. 14, 2009.

(30) Foreign Application Priority Data

Mar. 24, 2010 (KR) .................. 10-2010-0026229

(51) Int. Cl.
*H04W 74/00* (2009.01)
(52) U.S. Cl.
USPC ...................................................... 370/338
(58) Field of Classification Search
USPC ......... 370/315, 328, 470, 389, 338, 349, 465, 370/471, 472, 474, 506; 714/750
See application file for complete search history.

(56) References Cited

U.S. PATENT DOCUMENTS

| 7,327,726 B2 * | 2/2008 | Kye ............................. 370/389 |
| 7,349,434 B2 | 3/2008 | Kim et al. |

(Continued)

FOREIGN PATENT DOCUMENTS

| CN | 101222484 A | 7/2008 |
| JP | 2000-504163 A | 4/2000 |

(Continued)

OTHER PUBLICATIONS

Samsung India Siftware Operation Private Limited, "Method and System for Encoding Multiple Flow Information In Medium Access Control Protocol Data Unit", English translation date Feb. 20, 2009, pp. 0-10, 1-42 and 1-10.*

(Continued)

*Primary Examiner* — Kwang B Yao
*Assistant Examiner* — Syed M Bokhari
(74) *Attorney, Agent, or Firm* — Birch, Stewart, Kolasch & Birch, LLP (57) ABSTRACT

A method for transmitting a relatively large amount of data and an apparatus supporting the same are proposed. The data transmission method includes constructing a MAC PDU including an Advanced Generic MAC Header (AGMH) with a first length field, a MAC PDU Length Extended Header (MLEH) with a second length field, and payload, and transmitting the MAC PDU to a receiver. The first length field and the second length field are used for calculating a total length of the MAC PDU.

12 Claims, 7 Drawing Sheets

(56) References Cited

U.S. PATENT DOCUMENTS

| | | |
|---|---|---|
| 7,564,831 B2 | 7/2009 | Ihm et al. |
| 7,675,941 B2 | 3/2010 | Kim et al. |
| 7,684,762 B2 | 3/2010 | Ihm et al. |
| 2002/0027919 A1 | 3/2002 | Eneroth et al. |
| 2002/0067721 A1 | 6/2002 | Kye |
| 2008/0212513 A1 | 9/2008 | Tao et al. |
| 2009/0276677 A1* | 11/2009 | Saito et al. .................... 714/750 |
| 2009/0310533 A1* | 12/2009 | Zheng et al. ................. 370/328 |
| 2010/0214986 A1* | 8/2010 | Agiwal et al. ................ 370/328 |
| 2010/0278111 A1* | 11/2010 | Kashima et al. ............. 370/328 |
| 2011/0007753 A1* | 1/2011 | Agiwal et al. ................ 370/470 |
| 2012/0236780 A1* | 9/2012 | Tao et al. ..................... 370/315 |

FOREIGN PATENT DOCUMENTS

| | | |
|---|---|---|
| KR | 10-2004-0011692 A | 2/2004 |
| KR | 10-2005-0089700 A | 9/2005 |
| KR | 10-2006-0080542 A | 7/2006 |
| KR | 10-2008-0080440 A | 9/2008 |
| RU | 2 346 402 C1 | 2/2009 |
| WO | WO 2009/045530 A1 | 4/2009 |

OTHER PUBLICATIONS

Hamiti, "IEEE 802.16m System Description Document [Draft]," IEEE 802.16 Broadband Wireless Access Working Group <http://ieee802.org/16>, IEEE 802.16m-08/003r8, Apr. 10, 2009, 108 pages.

* cited by examiner

Figure 386-Extended Header Group Format

*MLEH: MPDU Length extended header
*LT: Length type (a)

METHOD FOR TRANSMITTING MEDIA ACCESS CONTROL PROTOCOL DATA UNIT

CROSS-REFERENCE TO RELATED APPLICATIONS

This application, which is a National Phase application of PCT/KR2010/002286 filed on Apr. 14, 2010, which claims the benefit under 35 U.S.C. §119(e) of U.S. Provisional Application No. 61/168,938 filed on Apr. 14, 2009 and under 35 U.S.C. §119(a) to Patent Application No. 10-2010-0026229 filed in the Republic of Korea, on Mar. 24, 2010. The entire contents of all of the above applications are hereby incorporated by reference.

TECHNICAL FIELD

The present invention relates to a method and apparatus for transmitting data in a wireless access system, and more particularly, to a method for transmitting a large amount of data and an apparatus supporting the same.

BACKGROUND ART

A description will be made of a generic header used in a wireless access system.

Also, a brief description will be made of a Media Access Control (MAC) Protocol Data Unit (PDU) used at a MAC layer.

In general, Layer 2 (L2) or its underlying layer, that is, a MAC layer (or a link layer) and a Physical (PHY) layer operate according to different protocols depending on wireless access systems such as Local Area Network (LAN), wireless LAN, 3rd Generation Partnership Project (3GPP)/3GPP2, and wireless Metropolitan Area Network (MAN). Accordingly, a different header format is defined for a MAC PDU in each wireless access system.

Figure 1:
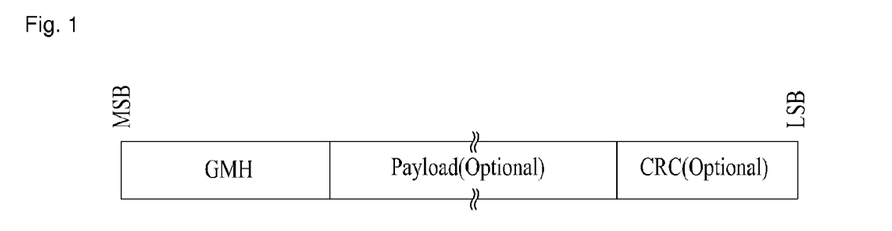
FIG. 1 illustrates an exemplary Media Access Control (MAC) Protocol data Unit (PDU) used in one of wireless access systems, Institute of Electrical and Electronics Engineers (IEEE) 802.16e.

FIG. 1 illustrates an exemplary MAC PDU in one of wireless access systems, Institute of Electrical and Electronics Engineers (IEEE) 802.16e.

Referring to FIG. 1, the MAC PDU may include a Generic MAC Header (GMH), Payload, and a Cyclic Redundancy Check (CRC). The GMH, which is used to deliver data between nodes at link layers, may include a MAC address or a link address, a header error check, and link-layer control information.

The Payload carries actual transmission data in the MAC PDU. The CRC refers to a technique for determining a check value to determine whether an error has occurred to the data during data transmission over a network. Although the GMH is mandatory, the Payload and the CRC are optional in the MAC PDU.

DISCLOSURE OF INVENTION

Technical Problem

Figure 2:
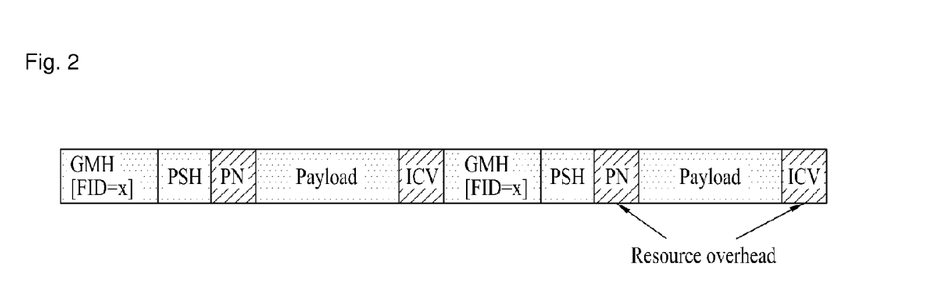
FIG. 2 illustrates an exemplary format of a MAC PDU for use in transmitting a large amount of data in the IEEE 802.16e system.

FIG. 2 illustrates an exemplary MAC PDU format for use in transmitting a large amount of data in the IEEE 802.16e system.

In a GMH, total length of the GMH is 48 bits (i.e. 6 byte) long. In this case a Length field comprised in the GMH is 11 bits long. However, The 11-bit Length field is not sufficient to express a packet having a MAC PDU size of 2047 or more bytes (e.g. an Internet Protocol version 6 (IPv6) packet).

To transmit a large amount of data, for example, 2044 to 2047 bytes of data, therefore, a transmitter should generate one or more MAC PDUS by fragmenting the transmission data. As a result, the data fragmentation may impose MAC control overhead on the network.

For example, each MAC PDU should include a Packet Number (PN) field that identifies a fragmented packet, an Integrity Check Value (ICV) in case of providing security to the MAC PDU, and/or a CRC. That is, when transmission data is fragmented, certain fields are added to each MAC header and/or each MAC PDU in order to carry control information about each data fragment.

When a plurality of Service Data Units (SDUs) with the same Flow Identifier (FID) are packed to a MAC PDU larger than 2047 bytes, the transmitter cannot transmit the packed data in the single MAC PDU. Consequently, the packed data should be fragmented and additional fields are required. For example, a Packing SubHeader (PSH) field, a PN field, and an ICV field for integrity protection should be added, as illustrated in FIG. 2.

Thus, transmission of data too large to be represented by the Length field may cause overhead to the network. To avert this problem, a technique for representing a MAC PDU size differently depending on a situation by placing a 1-bit flag before the Length field of the GMH is under consideration. However, the 1-bit addition may further increase the size of the GMH. Moreover, unnecessary overhead may be brought out when a packet of a size smaller than 2047 bytes is transmitted.

An object of the present invention devised to solve the problem lies on a method for efficiently transmitting a Media Access Control (MAC) Protocol Data Unit (PDU).

Another object of the present invention devised to solve the problem lies on a method for transmitting a large amount of data (e.g. 2047 or more bytes of data).

Another object of the present invention devised to solve the problem lies on a method for efficiently transmitting a MAC PDU (e.g. 2047 or more bytes of data) when a plurality of data are packed to a large amount of data.

Another object of the present invention devised to solve the problem lies on a new header structure for use in transmitting a large amount of data.

A further object of the present invention devised to solve the problem lies on an apparatus for implementing the above methods.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Solution to Problem

The present invention provides a method and apparatus for transmitting data in a wireless access system, particularly methods for transmitting a relatively large amount of data and apparatuses supporting the same.

The object of the present invention can be achieved by providing a method for transmitting a MAC PDU at a transmitter in a wireless access system, which includes constructing a MAC PDU including an Generic MAC Header (GMH) with a first length field, a MAC PDU Length Extended Header (MLEH) with a second length field, and payload; and transmitting the MAC PDU to a receiver.

In another aspect of the present invention, provided herein is a method for receiving a Media Access Control (MAC) Protocol Data Unit (PDU) at a receiver in a wireless access system, which comprises receiving from a transmitter a MAC PDU including an Generic MAC Header (GMH) with a first length field, a MAC PDU Length Extended Header (MLEH) with a second length field, and payload; and calculating a total length of the MAC PDU using a combination of the first length field and the second length field, wherein the second length field is appended to the first length field.

In another aspect of the present invention, provided herein is a transmitter for transmitting a Media Access Control (MAC) Protocol Data Unit (PDU) in a wireless access system, which includes a transmission module for transmitting the MAC PDU; and a processor for controlling construction and transmission of the MAC PDU. The processor constructs the MAC PDU including an Generic MAC Header (GMH) with a first length field, a MAC PDU Length Extended Header (MLEH) with a second length field, and payload and controls the transmission module to transmit the MAC PDU to a receiver. In this case, the MLEH is added to the MAC PDU for calculating the total length of the MAC PDU along with the first length field, and a combination of the first length field and the second length field indicates a total length of the MAC PDU.

In another aspect of the present invention a receiver for receiving a Media Access Control (MAC) Protocol Data Unit (PDU) in a wireless access system, the receiver comprises a reception module for receiving a MAC PDU and a processor for controlling reception and decoding of the MAC PDU. The processor controls the reception module to receive a MAC PDU including an Generic MAC Header (GMH) with a first length field, a MAC PDU Length Extended Header (MLEH) with a second length field, and payload, and calculates a total length of the MAC PDU using a combination of the first length field and the second length field. In this case, the second length field is appended to the first length field to indicate the total length of the MAC PDU.

The MLEH is added to the MAC PDU for calculating the total length of the MAC PDU, and a combination of the first length field and the second length field is used for indicating a total length of the MAC PDU.

The second length field may be appended to the first length field to indicate the total length of the MAC PDU. The MLEH appears after the GMH immediately and before the payload.

If other extended headers are included in the MAC PDU, the MLEH is positioned before the other extended headers. The MLEH is included in the MAC PDU to indicate the total length of the MAC PDU along with the first length field, when the length of the MAC PDU is greater than 2047 bytes. The first length field is 11 bits long and the second length field is 3 bits long.

The GMH further includes only a flow Identifier (ID) identifying a service flow of the MAC PDU and an extended header presence indicator (EH) field indicating whether an extended header is included, size of the flow ID is 4 bits, size of the EH field is 1 bit, and total size of the GMH is 2 bytes.

The MLEH further includes only a type field indicating a type of an extended header that is the MLEH, size of the type field is 4 bits and total size of the MLEH is 1 byte.

The transmitter may be a mobile station and the receiver may be a base station, on an uplink. The transmitter may be a base station and the receiver may be a mobile station, on a downlink.

In still further aspect of the present invention, provided herein a method for transmitting a Media Access Control (MAC) Protocol Data Unit (PDU) at a transmitter in a wireless access system, which includes a generic MAC header (GMH) to the MAC PDU, the GMH comprising only a flow ID, an extended header presence indicator, and a length field indicating the length in bytes of the MAC PDU; including at least one extended header and a payload to the MAC PDU and transmitting the constructed MAC PDU to the receiver.

The length field indicates a least significant bit (LSB) of the length in bytes of the MAC PDU when the at least one extend header includes a MAC PDU length extended header (MLEH) which is added to the MAC PDU to represent the total length of the MAC PDU along with the length field.

The MLEH includes a length field indicating a most significant bit (MSB) of the length in bytes of the MAC PDU. The length field in the MLEH is appended as the MSB to the length field in the GMH.

The embodiments of the present invention are mere part of preferred embodiments of the present invention. Various embodiments reflecting technical features of the present invention may be derived and understood from a detailed description of the present invention by those skilled in the art.

Advantageous Effects of Invention

The embodiments of the present invention have the following effects.

When a large amount of data is transmitted, addition of an extended header (e.g. a MAC PDU Length Extended Header (MLEH) or Length Extended Header (LEH)) defined according to the present invention enables efficient transmission of a MAC PDU.

With the use of an MLEH or the like, a MAC PDU can be efficiently transmitted, even when a plurality of data are packed to a large amount of data (e.g. 2047 or more bytes of data).

A large amount of data can be efficiently transmitted without the need for modifying an Advanced Generic MAC Header (AGMH), by use of an extended header structure according to the present invention.

Even though a data size is changed, a transmitter can configure a MAC PDU adaptively according to the changed data size. Therefore, signaling overhead is minimized irrespective of whether a small or large amount of data is transmitted.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

Embodiments of the present invention provide a method and apparatus for transmitting data in a wireless access system. Particularly, the embodiments of the present invention provide a method for transmitting a large amount of data and an apparatus supporting the same.

Embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of drawings, procedures or steps, which may ruin the substance of the present invention, are not explained. And, procedures or steps, which can be understood by those skilled in the art, are not explained as well.

In the embodiments of the present invention, a description is made of a data transmission and reception relationship between a Base Station (BS) and a Mobile Station (MS). Herein, the term 'BS' refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS (Base Station)' may be replaced with the term 'fixed station', 'Node B', 'enhanced Node B (eNode B or eNB)', "Advanced Base Station (ABS)', 'access point', etc.

The term 'MS (Mobile Station)' may be replaced with the term 'User Equipment (UE)', 'Subscriber Station (SS)', 'Mobile Subscriber Station (MSS)', 'mobile terminal', 'Advanced Mobile Station (AMS)', etc.

A transmitter means a node that transmits voice or data services and a receiver means a node that receives voice or data services. Hence, an MS may be a transmitter and a BS may be a receiver, on an uplink. Likewise, the MS may be a receiver and the BS may be a transmitter, on a downlink.

The embodiments of the present invention are supported by standard documents disclosed for at least one of wireless access systems including Institute of Electrical and Electronics Engineers (IEEE) 802.xx systems, a 3rd Generation Project Partnership (3GPP) system, a 3GPP Long Term Evolution (LTE) system, and a 3GPP2 system. In particular, the steps or parts, which are not described to clearly reveal the technical idea of the present invention in the embodiments of the present invention may be supported by the above documents.

All terminologies used herein may be supported by the above standard documents, particularly at least one of P802.16e-2004, P802.16e-2005, P802.16Rev2, and P802.16m documents which are the standards of IEEE 802.16.

Now a detailed description will be made of preferred embodiments of the present invention with reference to the accompanying drawings. The following detailed description presented with reference to the accompanying drawings is intended to describe not the only embodiment of the present invention but exemplary embodiments of the present invention.

Specific terms used for the embodiments of the present invention are provided to help the understanding of the present invention. These specific terms may be replaced with other terms within the scope and spirit of the present invention. For example, the term "Media Access Control (MAC) Protocol Data Unit (PDU)" may be interchangeably used with its abbreviation "MPDU".

Figure 3:
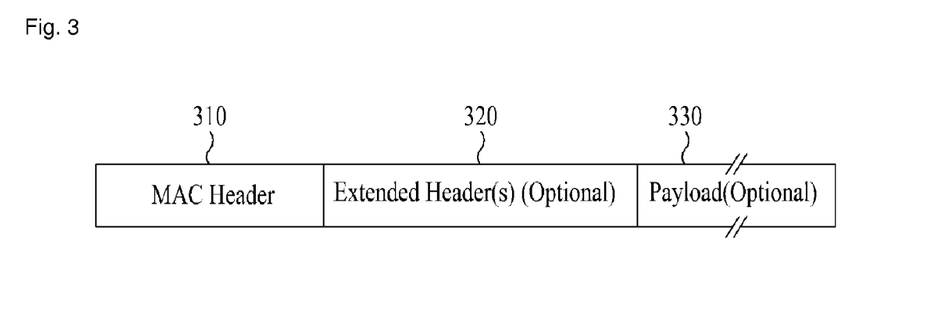
FIG. 3 illustrates an exemplary MAC PDU used in embodiments of the present invention.

FIG. 3 illustrates an exemplary MAC PDU used in embodiments of the present invention.

Referring to FIG. 3, the MAC PDU (or MPDU) may include a MAC Header 310, one or more Extended Headers 320, and Payload 330. The MAC PDU starts with the MAC header 310, which may be followed by the one or more Extended Headers 320. The Payload 330 may be positioned after the MAC header 310. If the one or more Extended Headers 320 are included in the MAC PDU, the Payload 330 may follow the Extended Headers 320.

The Extended Headers 320 and the Payload 330 are optional in the MAC PDU. Without the Payload 330, the one or more Extended Headers 320 are not included in the MAC PDU.

There are three types of MAC headers defined in an IEEE 802.16m system, Advanced Generic MAC Header (AGMH), Compact MAC Header (CMH), and MAC Signaling Header (MSH). The AGMH is used for a downlink/uplink MAC PDU carrying a MAC control message and/or convergence-sublayer data. The CMH is used for a MAC PDU of a connection with persistent allocation or group allocation that supports Voice over Internet Protocol (VoIP). The MSH is transmitted alone or in combination with a MAC PDU.

It is assumed that the MAC header 310 illustrated in FIG. 3 is an AGMH newly defined according to the present invention, other than the GMH defined in the IEEE 802.16e system (refer to FIG. 1).

Table 1 below illustrates an exemplary format of the newly defined AGMH according to the present invention.

TABLE 1

| Syntax | Size (bits) | Notes |
|---|---|---|
| Advanced Generic MAC Header( ) { | | |
| Flow ID | 4 | Flow identifier |
| EH | 1 | Extended Header Presence Indicator: When set to 1, this field indicates that an extended header is present following this AGMH. |
| Length | 11 | This field indicates the length of the MAC PDU including the AGMH and the extended header in bytes, if the AGMH and the extended header are present. If an MLEH is included in the MAC PDU, the Length field provides 11 LSBs of the length in byte of the MAC PDU. |
| } | | |

Referring to Table 1, the AGMH is 2 bytes long and may include Flow ID field, EH (Extended Header Presence Indicator) filed, and Length field.

The Flow ID field identifies a service flow connection for which the MAC PDU is transmitted. The EH field indicates whether an extended header exists after the AGMH. The Length field specifies the total length of the MAC PDU in bytes. Specifically, the Length field of the AGMH may represent up to a MAC PDU size of 2047 bytes.

Figure 4:
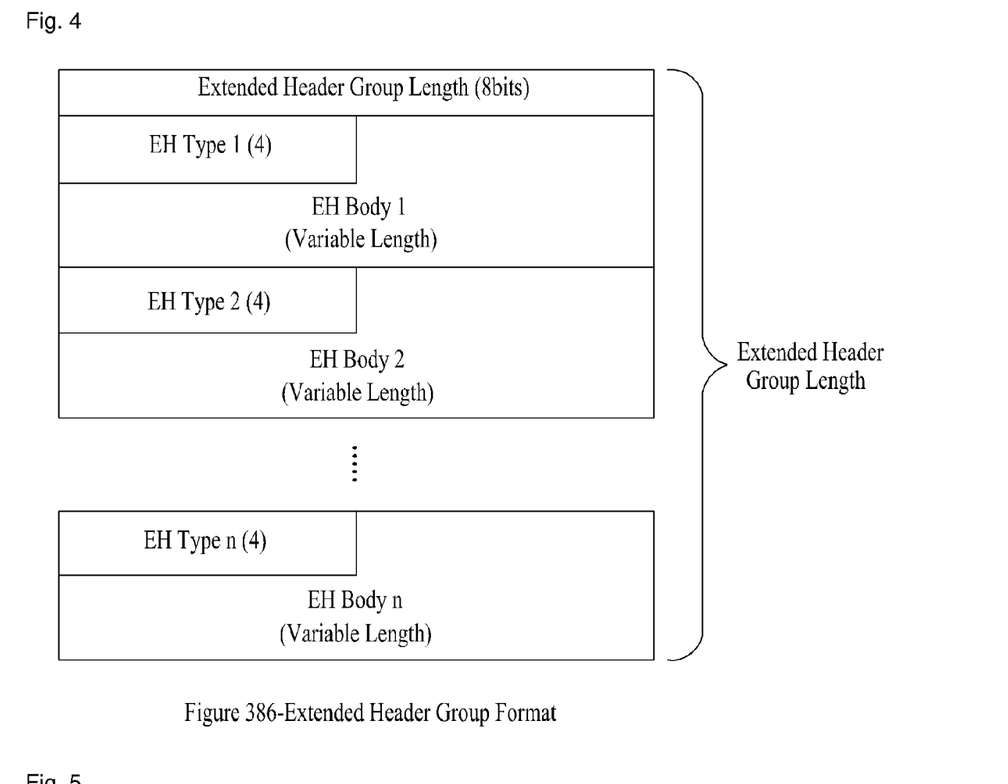
FIG. 4 illustrates an exemplary Extended Header Group (EHG) used in embodiments of the present invention.

FIG. 4 illustrates an exemplary Extended Header Group (EHG) used in embodiments of the present invention.

A receiver may determine from the EH field of an AGMH whether an Extended Header Group (EHG) is included in a MAC PDU including the AGMH. If the EHG is included in the MAC PDU, the EHG appears immediately after the AGMH and before a payload. Unlike the payload, the EHG is not encrypted.

Table 2 below illustrates an exemplary format of the EHG.

TABLE 2

| Syntax | Size (bits) | Notes |
|---|---|---|
| Extended Header Group Length | 8 | This field specifies the total length in bytes of the EHG including all extended headers and the Extended Header Group Length filed in bytes. |
| Extended Header Type | 4 | Refer to Table 3 |
| Extended Header Body | variable | The size of an extended header depends on its Extended Header Type defined in Table 3. An extended header including an Extended Header Type is allocated in units of bytes. |

Referring to Table 2, the EHG includes Extended Header Group Length, one or more Extended Header Types, and one or more Extended Header Bodies. The Extended Header Group Length field specifies the total length of the EHG including all extended headers and the Extended Header Length filed. Each of the Extended Header Type fields indicates the type of an extended header included in the EHG. Each of the Extended Header Body fields has a size that is determined according to an associated Extended Header Type field.

Table 3 illustrates an exemplary format of the Extended Header Type field.

TABLE 3

| Extended Header Type | Name | Notes |
|---|---|---|
| 0b0110 | Fragment and Packing Extended Header | See 16.2.2.2.1 |
| — | MAC Control Extended Header | See 16.2.2.2.2 |
| 0b0000 | Multiplexing Extended Header | See 16.2.2.2.3 |
| 0b0001 | Message ACK Extended Header | See 16.2.2.2.4 |
| 0b0010 | Sleep Control Extended Header | See 16.2.2.2.5 |
| 0b0011 | Correlation Matrix Feedback Extended Header | See 16.2.2.2.6 |
| 0b0100 | MIMO Feedback Extended Header | See 16.2.2.2.7 |
| 0b0101 | Piggybacked Bandwidth Request Extended Header | See 16.2.2.2.8 |
| 0b0111 | MAC PDU Length Extended Header | See 16.2.2.2.9 |
| 0b1000 | ARQ Feedback Extended Header | See 16.2.2.2.10 |
| 0b1001-0b1111 | reserved | |

From Table 3, Extended Header Types available to the EHG illustrated in FIG. 4 are known. The sections of the IEEE 802.16m/D4 document may be referred to for the contents of the extended headers listed in Table 3.

Figure 5:
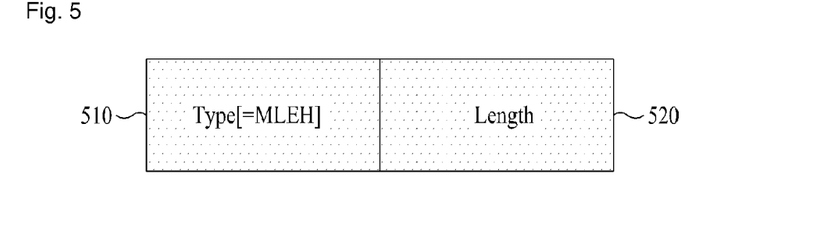
FIG. 5 illustrates a new extended header defined to transmit a large amount of data in one MAC PDU according to an embodiment of the present invention.

FIG. 5 illustrates an example of a newly defined extended header for use in transmitting a large amount of data in one MAC PDU according to an embodiment of the present invention.

According to the present invention, a new extended header is defined to transmit a relatively large amount of data in one MAC PDU. That is, FIG. 5 illustrates an MLEH.

In embodiments of the present invention, "a relatively large amount of data" refers to 2044 to 2047 bytes or more bytes of data. Preferably, a new MLEH may be included in a MAC PDU, when the MAC PDU is larger than 2047 bytes.

Referring to FIG. 5, the MLEH may include Type field 510 and Length field 520. The Type field 510 indicates that this extended header is the defined MLEH, other than the extended headers described in Table 4. The Length field 520 specifies the total length of the MPDU, together with the Length field of the AGMH defined in Table 1.

In the case of an MAC PDU of 2047 or more bytes in total, the transmitter transmits the MAC PDU added with an MLEH configured as illustrated in FIG. 5 to the receiver. The receiver decodes the MAC PDU and calculates the total length of the MAC PDU using the Length field of the MLEH and the Length field of the AGMH.

Figure 6:
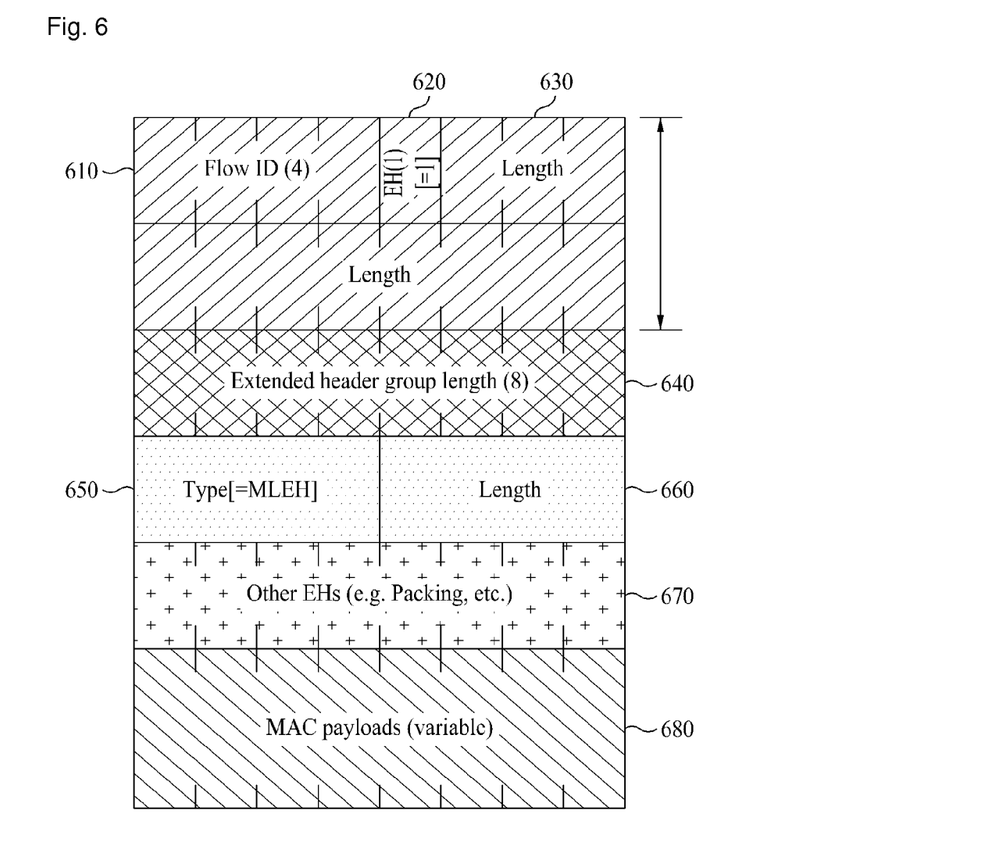
FIG. 6 illustrates a MAC PDU structure including a MAC PDU Length Extended Header (MLEH), for transmitting a large amount of data according to an embodiment of the present invention.

FIG. 6 illustrates an exemplary format of a MAC PDU including an MLEH for use in transmitting a large amount of data according to an embodiment of the present invention.

Referring to FIG. 6, the MAC PDU may include an AGMH, an EHG, and MAC payloads 680. The AGMH includes a 4-bit Flow ID 610, a 1-bit EH field 620, and an 11-bit Length field 630. The EHG may include an Extended Header Group Length field 640, an MLEH including a Type field 650 and a Length field 660, and other extended headers 670.

As illustrated in FIG. 6, when an MLEH is used together with other extended headers, the MLEH is the first extended header that is positioned before any other extended header. With the use of the new defined MLEH illustrated in FIG. 6, the transmitter may transmit a MAC PDU of 2047 to 32767 bytes.

Figure 7:
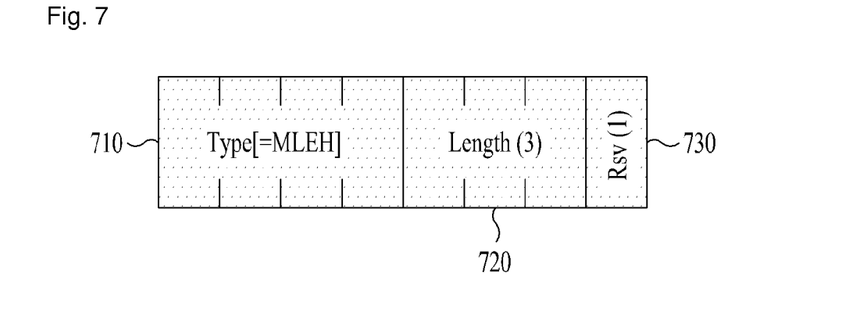
FIG. 7 illustrates a new extended header defined to transmit a large amount of data in one MAC PDU according to another embodiment of the present invention.

FIG. 7 illustrates a new extended header defined to transmit a large amount of data in one MAC PDU according to another embodiment of the present invention.

In embodiments of the present invention, "a relatively large amount of data" refers to 2045 to 2048 bytes or more bytes of data, and an MAC PDU size exceeding 2047 bytes.

Referring to FIG. 7, an MLEH may include a 4-bit Type field 710 and a 3-bit Length field 720. It is preferred that the MLEH is 1 byte. Thus, one bit set to a reserved value may be added to match to the length of one byte.

Table 4 illustrates an exemplary format of the MLEH.

TABLE 4

| Syntax | Size (bits) | Notes |
| --- | --- | --- |
| MLEH(){ | | |
| Type | 4 | This field indicates that the extended header is a MAC PDU Length Extended Header. |
| Length | 3 | This field provides 3 MSBs of the length of the MAC PDU. For example, the 3 bit length is to be appended as MSB to the 11 bit length field in AGMH. In combination with the 11-bit Length field of the AGMH, this Length field indicates the length of the MAC PDU. That is, the length of the MAC PDU is MLEH (Length (3)) ... AGMH (Length (11)). |
| Reserved | 1 | Set to 0 |
| } | | |

Referring to Table 4, the Type field 710 indicates that this extended header is an MLEH added to transmit a large amount of data. The Length field 720 specifies the total length of the MAC PDU in combination with the Length field of the AGMH.

If an MLEH is included in a MAC PDU, the MLEH is positioned before any other extended header of the MAC PDU. For example, the MLEH appears immediately after the AGMH, before payload. When used along with other extended headers, the MLEH preferably precedes the other extended headers in an EHG because the receiver can determine the total length of the MAC PDU by first decoding the MLEH.

The Length field 720 of the MLEH may specify 3 MSBs of the extended length of the MAC PDU and the Length field of the AGMH may specify 11 LSBs of the extended length of the MAC PDU.

Figure 8:
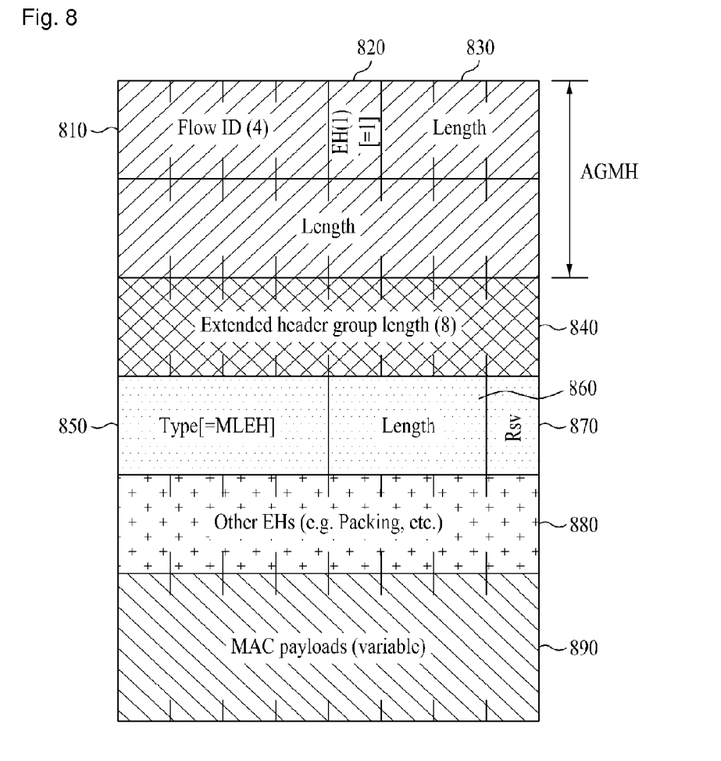
FIG. 8 illustrates a MAC PDU structure including an MLEH, for transmitting a large amount of data according to another embodiment of the present invention.

FIG. 8 illustrates a MAC PDU structure including an MLEH, for transmitting a large amount of data according to another embodiment of the present invention.

Referring to FIG. 8, a MAC PDU may include an AGMH, an EHG, and MAC payloads 890. The AGMH includes a 4-bit Flow ID field 810, a 1-bit EH field 820, and an 11-bit Length field 830. The EHG may include an Extended Header Group Length field 840, an MLEH having a Type field 850, a Length field 860, and a Reserved bit 870, and other extended headers 880.

The Flow ID field 810 identifies a service flow for which the MAC PDU is transmitted. When the EH field 820 is set to '1', this means that one or more extended headers are included in the MAC PDU. The Length field 830 may specify the total length of the MAC PDU along with the Length field 860 of the MLEH. The Extended Header Group Length field 840 may specify the total length of the EHG and the Type field 850 may identify the MLEH.

As illustrated in FIG. 8, when an MLEH is used along with other extended headers, the MLEH precedes the other extended headers. If the MLEH defined in FIG. 8 is used, the transmitter may transmit a MAC PDU of 2047 to 16384 bytes to the receiver.

Figure 9:
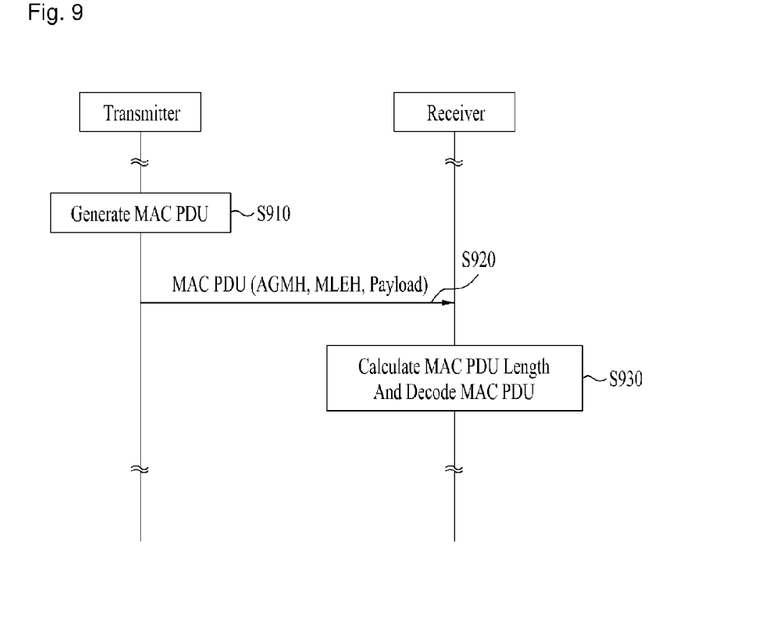
FIG. 9 is a diagram illustrating a signal flow for an operation for transmitting a MAC PDU of a size larger than 2047 bytes at a transmitter according to an embodiment of the present invention.

FIG. 9 is a diagram illustrating a signal flow for an operation for transmitting a MAC PDU of a size larger than 2047 bytes at a transmitter according to an embodiment of the present invention.

In embodiments of the present invention, a transmitter and a receiver are relatively decided depending on a downlink or an uplink. For example, the transmitter may be an MS and the receiver may be a BS on the uplink, whereas the transmitter may be a BS and the receiver may be an MS on the downlink. In addition, steps described at the FIG. 9 are able to be performed at Medium Access Control (MAC) layers of the transmitter and the receiver. That is, actions of the transmitter and the receiver can be referred to actions the MAC layers of the transmitter and the receiver.

Referring to FIG. 9, the transmitter may need to transmit a large amount of data to the receiver during a data transmission operation. For example, if a MAC PDU to be transmitted exceeds 2047 bytes, an AGMH is not sufficient to represent the MAC PDU size. Accordingly, the transmitter constructs a MAC PDU including an Advanced Generic MAC Header (AGMH) described with table 1 and an MLEH described with reference to FIGS. 5 to 8 (preferably FIG. 7) in step S910.

In step S920, the transmitter transmits the constructed MAC PDU with the AGMH, the MLEH, and payload to the receiver.

The receiver receives the MAC PDU from the transmitter and decodes it. The receiver determines whether an at least one extended header is included in the MAC PDU from the EH field. When the EH field is set to '1', the receiver further decodes the at least one extended header included in the MAC PDU.

When the receiver determines from the Type field of the MLEH that the MLEH is included in the MAC PDU, it calculates the total length of the MAC PDU using the Length field of the AGMH along with the Length field of the MLEH in step S930.

The total length of the MAC PDU may be calculated by appending the value of the Length field of the MLEH to the value of the Length field of the AGMH. The Length field of the MLEH may indicate MSBs or LSBs of the length of the MAC PDU. A description will now be made of a method for calculating the length of the MAC PDU.

Figure 10:
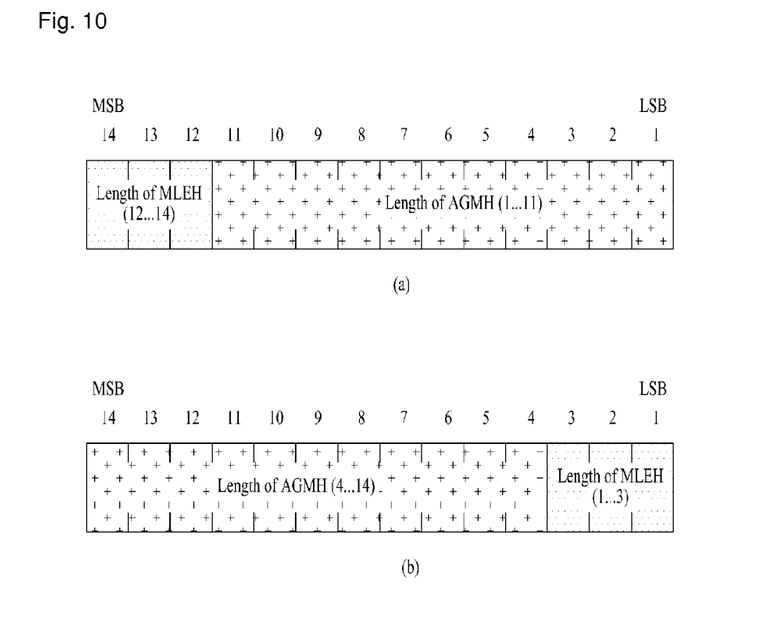
FIG. 10 illustrates a method for calculating a Length field of a MAC PDU including an MLEH in order to calculate the total length of the MAC PDU.

FIG. 10 illustrates a method for calculating the length of a MAC PDU including an MLEH.

Referring to FIG. 10(a), the Length field of the MLEH may correspond to three MSBs of the Length field of the MAC PDU and the Length field of the AGMH may correspond to 11 LSBs of the Length field of the MAC PDU. That is, the length field of the MLEH is appended to the length field of the AGMH.

Referring to FIG. 10(b), the Length field of the MLEH may correspond to 3 LSBs of the Length field of the MAC PDU and the Length field of the AGMH may correspond to 11 MSBs of the Length field of the MAC PDU.

Referring back to FIG. 9, in step S930, the receiver may calculate the total length of the MAC PDU by configuring the Length field of the MAC PDU as illustrated in FIG. 10.

Therefore, the MAC layer of the receiver is able to distinguish and decode the payload from the MAC PDU based on a combination of the length field of AGMH and the length field of MLEH. Accordingly, the MAC layer of the receiver transfers the payload to a high layer entity or a lower layer entity of the receiver.

Figure 11:
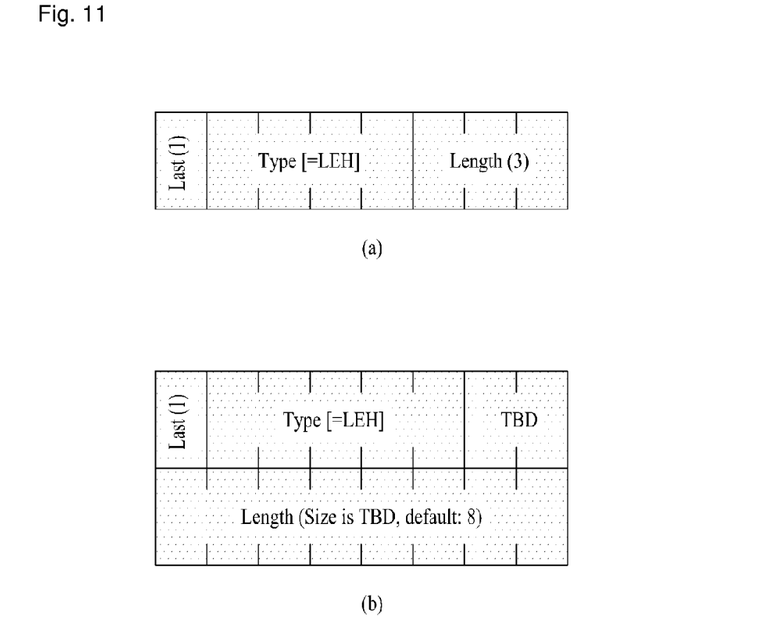
FIG. 11 illustrates a new extended header defined to transmit a large amount of data in one MAC PDU according to a further embodiment of the present invention.

FIG. 11 illustrates a new extended header defined to transmit a large amount of data in one MPDU according to a further embodiment of the present invention.

According to the present invention, a new Length Extended Header (LEH) is defined to transmit a relatively large amount of data in one MAC PDU. In embodiments of the present invention, "a relatively large amount of data" refers to the size of an MAC PDU including data, grater than 2047 bytes.

Referring to FIG. 11(a), a 1-byte LEH may include a 1-bit Last field indicating whether another extended header follows, a 4-bit Type field indicates the extended header type, and a 3-bit Length field indicates the total length of the MPDU along with the length field of the AGMH.

Referring to FIG. 11(b), a 2-byte LEH may include a 1-bit Last field, a 5-bit Type field, and an 8-bit Length field.

The Type field of the LEH illustrated in FIGS. 11(a) and 11(b) identifies the defined LEH, not any of the extended headers listed in Table 4. The Length field of the LEH may specify the total length of a MAC PDU along with the Length field of the AGMH defined in Table 1.

For example, if the transmitter transmits a MAC PDU of 2047 or more bytes in total, the transmitter includes an LEH configured as illustrated in FIG. 11 in the MAC PDU. Upon decoding the LEH, the receiver may calculate the total length of the MAC PDU using the Length field of the LEH and the Length field of the AGMH.

Figure 12:
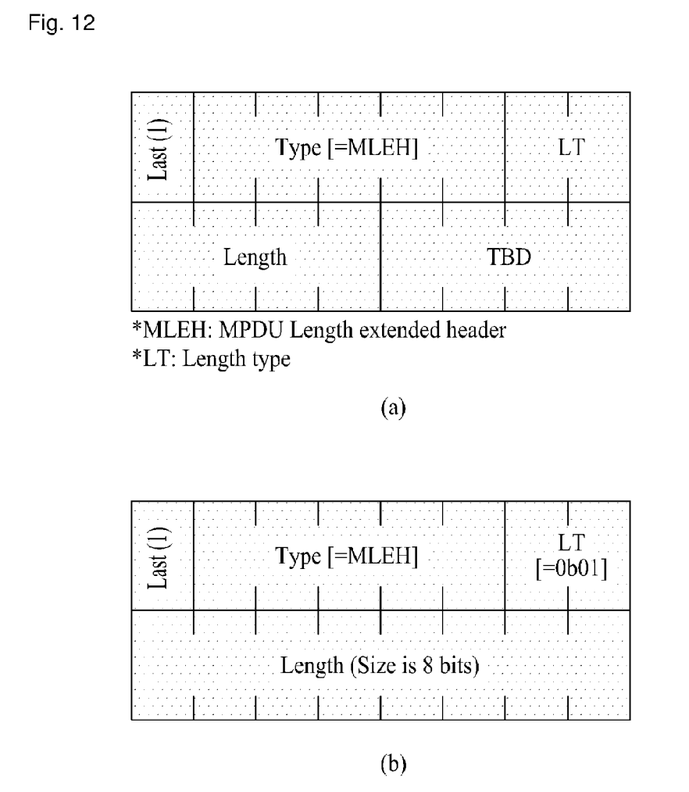
FIG. 12 illustrates an MLEH defined to transmit a large amount of data in one MAC PDU according to a further embodiment of the present invention.

FIG. 12 illustrates an MLEH defined to transmit a large amount of data in one MAC PDU according to a further embodiment of the present invention.

An extended header for use in applying a Length field of a variable size to an MLEH according to a communication environment is provided in this embodiment. To vary the Length field of the MLEH in different communication environments, the MLEH may include a Length Type (LT) field.

Table 5 below illustrates an exemplary format of the LT field.

TABLE 5

| Syntax | Size (bits) | Notes |
|---|---|---|
| Length Type | 2 | 0b00: 4-bit Length field 0b01: 8-bit Length field 0b10: 12-bit Length field 0b11: 16-bit Length field |

Referring to Table 5, the LT field occupies 2 bits, indicating whether the Length field of the MLEH is 4, 8, 12 or 16 bits long.

FIG. 12(a) illustrates an LT field set to 0b00. Thus the Length field of the MLEH is 4 bits long and the total length of the MLEH is 2 bytes. The remaining 4 bits may be reserved or used for any other usage.

FIG. 12(b) illustrates an LT field set to 0b01. Thus the Length field of the MLEH is 8 bits long and the total length of the MLEH is 2 bytes.

While not shown, when the LT field is set to 0b10 or 0b11, the MLEH is 3 bytes long. In this case, a very large amount of data can be transmitted.

Figure 13:
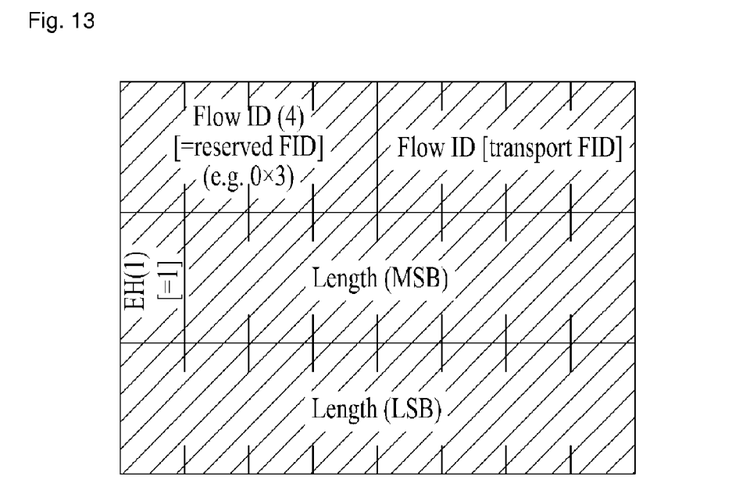
FIG. 13 illustrates a new Advanced Generic MAC Header (AGMH) for use in transmitting a large amount of data using a Flow Identifier (FID) according to an embodiment of the present invention.

FIG. 13 illustrates a new AGMH for use in transmitting a large amount of data using an FID according to an embodiment of the present invention.

A predetermined Flow ID indicates that the AGMH includes a long Length field. Referring to FIG. 13, the AGMH may include a 4-bit Flow ID set to 0x3, a 4-bit Flow ID identifying a service flow for which a MAC PDU is used, a 1-bit EH field indicating whether an EHG is included, and a Length field which is 11 to 15 bits long.

Figure 14:
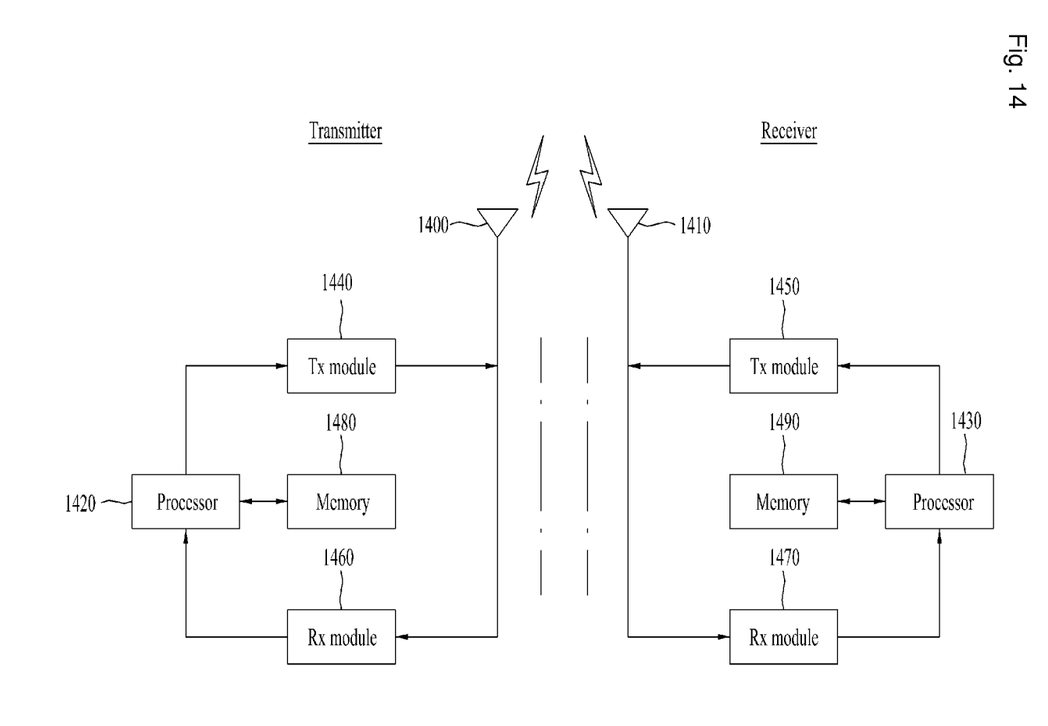
FIG. 14 is a block diagram of a transmitter and a receiver for implementing the embodiments of the present invention illustrated in FIGS. 2 to 13 according to an embodiment of the present invention.

FIG. 14 is a block diagram of a transmitter and a receiver for implementing the embodiments of the present invention illustrated in FIGS. 2 to 13 according to an embodiment of the present invention.

The transmitter and the receiver may be an MS and a BS respectively on a UL whereas the transmitter and the receiver may be a BS and an MS respectively on a DL.

The transmitter and the receiver may include Transmission (Tx) modules 1440 and 1450 and Reception (Rx) modules 1460 and 1470, for controlling transmission and reception of information, data and/or messages, and antennas 1400 and 1410 for transmitting and receiving information, data and/or messages. The transmitter and receiver may further include processors 1420 and 1430 for implementing the above-described embodiments of the present invention, and memories 1480 and 1490 for temporarily or permanently storing data generated during operations of the processors 1420 and 1430.

Especially, the processors 1420 and 1430 of the transmitter and the receiver may include logical entities for generating and decoding MAC PDUs according to the embodiments of the present invention, namely MAC layers. Each of the MAC layers may include a MAC control module for controlling MAC PDU construction, a fragmentation functionality module for fragmenting data, and a packing module for packing data.

Upon receipt of SDUs from a higher layer, the MAC layer of the transmitter may generate a MAC PDU by fragmenting or packing them.

For example, the transmitter generates a MAC header for transmitting a MAC PDU (refer to Table 1) and adds the MAC header to the MAC PDU. Also, when transmitting a relatively large amount of data, the transmitter may further include an extended header described with reference to FIGS. 2 to 12 in the MAC PDU. Preferably, an MLEH is 1 byte long, including a 4-bit Type field, a 3-bit Length field, and a 1-bit reserved value (refer to FIGS. 7 and 8).

The MAC layer of the transmitter may transmit the generated MAC PDU to a PHY layer and the PHY layer may transmit the MAC PDU to the receiver. That is, the processor 1420 of the transmitter may transmit the MAC PDU to the receiver through the Tx module 1440. Accordingly, the transmitter can transmit even a large amount of data efficiently without transmitting additional MAC PDUS.

The processor 1430 of the receiver may control the Rx module 1470 to receive a MAC PDU from the transmitter.

The MAC layer in the processor 1430 may decode the MAC PDU. If an MLEH is included in the MAC PDU, the processor 1430 may calculate the total length of the MAC PDU using the Length fields of an AGMH and the MLEH (refer to FIGS. 9 and 10). Therefore, the receiver can decode even a large MAC PDU accurately.

The Tx modules 1440 and 1450 and Rx modules 1460 and 1470 of the transmitter and the receiver may perform packet modulation and demodulation, high-speed packet channel coding, Orthogonal Frequency Division Multiple Access (OFDMA) packet scheduling, Time Division Duplex (TDD) packet scheduling, and/or channel multiplexing, for data transmission and reception.

Meanwhile, the MS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. Code Division Multiple Access 2000 (CDMA 2000), Wideband CDMA (WCDMA), etc.)

Embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an exemplary embodiment of the present invention or included as a new claim by a subsequent amendment after the application is filed.

INDUSTRIAL APPLICABILITY

The embodiments of the present invention are applicable to various wireless access systems including a 3GPP system, a 3GPP2 system, and/or an IEEE 802.xx system. Besides these wireless access systems, the embodiments of the present invention are applicable to all technical fields in which the wireless access systems find their applications.

The invention claimed is:

1. A method for transmitting a Media Access Control (MAC) Protocol Data Unit (PDU) at a transmitter in a wireless access system, the method comprising: constructing a MAC PDU including a Generic MAC Header (GMH) with a first length field, an extended header with a second length field, and payload; and transmitting the MAC PDU to a receiver, wherein a size of the first length is 11 bits, wherein the second length field is 3 bits long, wherein the first length field indicates a normal length in bytes of the MAC PDU that is represented by the 11 bits, and a combination of the first length field and the second length field used to indicate the extended length of the MAC PDU along with the first length field when the extended length of the MAC PDU is more than 2048 bytes, and wherein the second length field is appended to the first length field to indicate a total length of the MAC PDU.

2. The method according to claim 1, wherein the extended header appears immediately after the GMH and before the payload.

3. The method according to claim 1, wherein the extended header is not encrypted.

4. The method according to claim 1, wherein the GMH further includes only a flow Identifier (ID) identifying a service flow of the MAC PDU and an extended header presence indicator (EH) field indicating whether the extended header is included, and
wherein size of the flow ID is 4 bits, size of the EH field is 1 bit, and total size of the GMH is 2 bytes.

5. The method according to claim 1, wherein the transmitter is a mobile station and the receiver is a base station at uplink transmission; and
the transmitter is the base station and the receiver is the mobile station at downlink transmission.

6. A method for receiving a Media Access Control (MAC) Protocol Data Unit (PDU) at a receiver in a wireless access system, the method comprising: receiving from a transmitter a MAC PDU including a Generic MAC Header (GMH) with a first length field, an extended header with a second length field, and payload; and calculating a total length of the MAC PDU using a combination of the first length field and the second length field, wherein a size of the first length field is 11 bits, wherein the second length field is 3 bits long, wherein the first length field indicates a normal length in bytes of the MAC PDU which is represented by the 11 bits, and the combination of the first length field and the second length field indicates an extended length of the MAC PDU along with the first length field when the extended length of the MAC PDU is more than 2048 bytes, and wherein the second length field is appended to the first length field to indicate the total length of the MAC PDU.

7. The method according to claim 6, wherein the GMH further includes only a flow Identifier (ID) identifying a service flow of the MAC PDU and an extended header presence indicator (EH) field indicating whether the extended header is included, and
wherein size of the flow ID is 4 bits, size of the EH field is 1 bit, and total size of the GMH is 2 bytes.

8. The method according to claim 6, wherein the transmitter is mobile station and the receiver is base station at uplink transmission; and
the transmitter is base station and the receiver is mobile station at downlink transmission.

9. A transmitter for transmitting a Media Access Control (MAC) Protocol Data Unit (PDU) in a wireless access system, the transmitter comprising: a transmission module for transmitting the MAC PDU; and a processor for controlling construction and transmission of the MAC PDU, wherein the processor is configured to construct the MAC PDU including a Generic MAC Header (GMH) with a first length field, an extended header with a second length field, and payload, and control the transmission module to transmit the MAC PDU to a receiver, wherein a size of the first length field is 11 bits, and the second length field is appended to the first length field to indicate a total length of the MAC PDU, wherein the second length field is 3 bits long, and wherein the first length field indicates a normal length in bytes of the MAC PDU that is represented by the 11 bits, and a combination of the first length field and the second length field indicates an extended length of the MAC PDU when the extended length of the MAC PDU is more than 2048 bytes.

10. The transmitter according to claim 9, wherein the extended header appears immediately after the GMH and before the payload and wherein the second length field is appended to the first length field.

11. A receiver for receiving a Media Access Control (MAC) Protocol Data Unit (PDU) in a wireless access system, comprising:

a reception module for receiving a MAC PDU; and a processor for controlling reception and decoding of the MAC PDU, wherein the processor is configured to control the reception module to receive a MAC PDU including a Generic MAC Header (GMH) with a first length field, an extended header with a second length field, and payload; and calculate a total length of the MAC PDU using a combination of the first length field and the second length field, wherein a size of the first length field is 11 bits, and the second length field is appended to the first length field to indicate the total length of the MAC PDU, wherein the second length field is 3 bits long, and wherein the first length field indicates a normal length in bytes of the MAC PDU which is represented by the 11 bits, and a combination of the first length field and the second length field indicates an extended length of the MAC PDU when the extended length of the MAC PDU is more than 2048 bytes.

12. The receiver according to claim 11, wherein the extended header appears immediately after the GMH and before the payload, and wherein the second length field is appended to the first length field.

* * * * *